United States Patent
Surprise et al.

(10) Patent No.: US 10,902,178 B1
(45) Date of Patent: Jan. 26, 2021

(54) WIRE ORIENTATION-BASED LATCH SHUDDLING

(71) Applicant: INTERNATIONAL BUSINESS MACHINES CORPORATION, Armonk, NY (US)

(72) Inventors: Jesse Surprise, Highland, NY (US); Gerald Strevig, III, Cedar Park, TX (US); Shawn Kollesar, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/565,801

(22) Filed: Sep. 10, 2019

(51) Int. Cl.
  *G06F 30/398* (2020.01)
  *G06F 119/12* (2020.01)

(52) U.S. Cl.
  CPC ........ *G06F 30/398* (2020.01); *G06F 2119/12* (2020.01)

(58) Field of Classification Search
  CPC .......................... G06F 2119/12; G06F 30/398
  USPC ........................................................ 716/114
  See application file for complete search history.

(56) References Cited

U.S. PATENT DOCUMENTS

| | | | |
|---|---|---|---|
| 6,609,228 B1 | 8/2003 | Bergeron et al. | |
| 7,549,137 B2* | 6/2009 | Alpert | G06F 30/392 716/114 |
| 8,495,552 B1* | 7/2013 | Cho | G06F 30/327 716/132 |
| 8,677,299 B1* | 3/2014 | Alpert | G06F 30/34 716/118 |
| 9,495,501 B1* | 11/2016 | Kim | G06F 30/392 |
| 2009/0193377 A1* | 7/2009 | Puri | G06F 30/394 716/119 |
| 2012/0110532 A1* | 5/2012 | Alpert | G06F 30/392 716/114 |
| 2013/0326451 A1 | 12/2013 | Cho et al. | |
| 2014/0149957 A1* | 5/2014 | Alpert | G06F 30/392 716/122 |

OTHER PUBLICATIONS

Wu, et al., "Flip-flop clustering by weighted k-means algorithm," Proceedings of the 53rd Annual Design Automation Conference, Article No. 82, Jun. 2016, 6 pages.

* cited by examiner

*Primary Examiner* — Suresh Memula
(74) *Attorney, Agent, or Firm* — Cantor Colburn LLP; William Kinnaman

(57) ABSTRACT

Methods, systems and computer program products for providing wire orientation-based latch shuddling are provided. Aspects include determining a classification of each latch of a plurality of latches as having a vertical orientation, a horizontal orientation or a mixed orientation. Aspects also include clustering the plurality of latches into one or more clusters based on the classifications of the plurality of latches. Each of the one or more clusters includes a unique set of latches of the plurality of latches. Aspects also include shuddling each of the one or more clusters around a local clock buffer within a layout. Each cluster of the one or more clusters is shuddled in a configuration around the local clock buffer based on the classifications of the corresponding unique set of latches of the plurality of latches.

20 Claims, 9 Drawing Sheets

WIRE ORIENTATION-BASED LATCH SHUDDLING

BACKGROUND

The present invention generally relates to the fabrication and design of semiconductor chips and integrated circuits and more specifically, to providing wire orientation-based latch shuddling.

A microelectronic integrated circuit (IC) chip can generally be thought of as a collection of logic cells with electrical interconnections between the cells, formed on a semiconductor substrate (e.g., silicon). An IC may include a very large number of cells and require complicated connections between the cells. Cell placement in semiconductor fabrication involves a determination of where particular cells should optimally (or near-optimally) be located on the surface of an integrated circuit device. While various techniques provide adequate placement of cells with regard to their data interconnections, design consideration must also be given to constructing a clock network for the cells, which require a large amount of power. One method involves the use of local clock buffers (LCBs) to distribute the clock signals. Generally, each LCB controls a plurality of latches that can be selectively turned on and off by the LCB. The physical arrangement of the LCBs and latches within a semiconductor layout can be influenced by considerations of signal timing, signal congestion, power consumption and placement of other circuit elements. Latches are typically pulled to (away from their ideal locations) and grouped around (i.e., shuddled) an LCB during the design process. LCB's can be cloned to improve timing at the expense of higher power consumption and the inclusion of more (less full) LCB's in the design can result in latches that, will be positioned closer to their ideal locations than if less LCB's are used.

SUMMARY

Embodiments of the present invention are directed to providing wire orientation-based latch shuddling. A non-limiting example of the computer-implemented method includes determining a classification of each latch of a plurality of latches as having a vertical orientation, a horizontal orientation or a mixed orientation. The method also includes clustering the plurality of latches into one or more clusters based on the classifications of the plurality of latches. Each of the one or more clusters includes a unique set of latches of the plurality of latches. The method also includes shuddling each of the one or more clusters around a local clock buffer within a layout. Each cluster of the one or more clusters is shuddled in a configuration around a respective local clock buffer based on the classifications of the corresponding unique set of latches of the plurality of latches.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
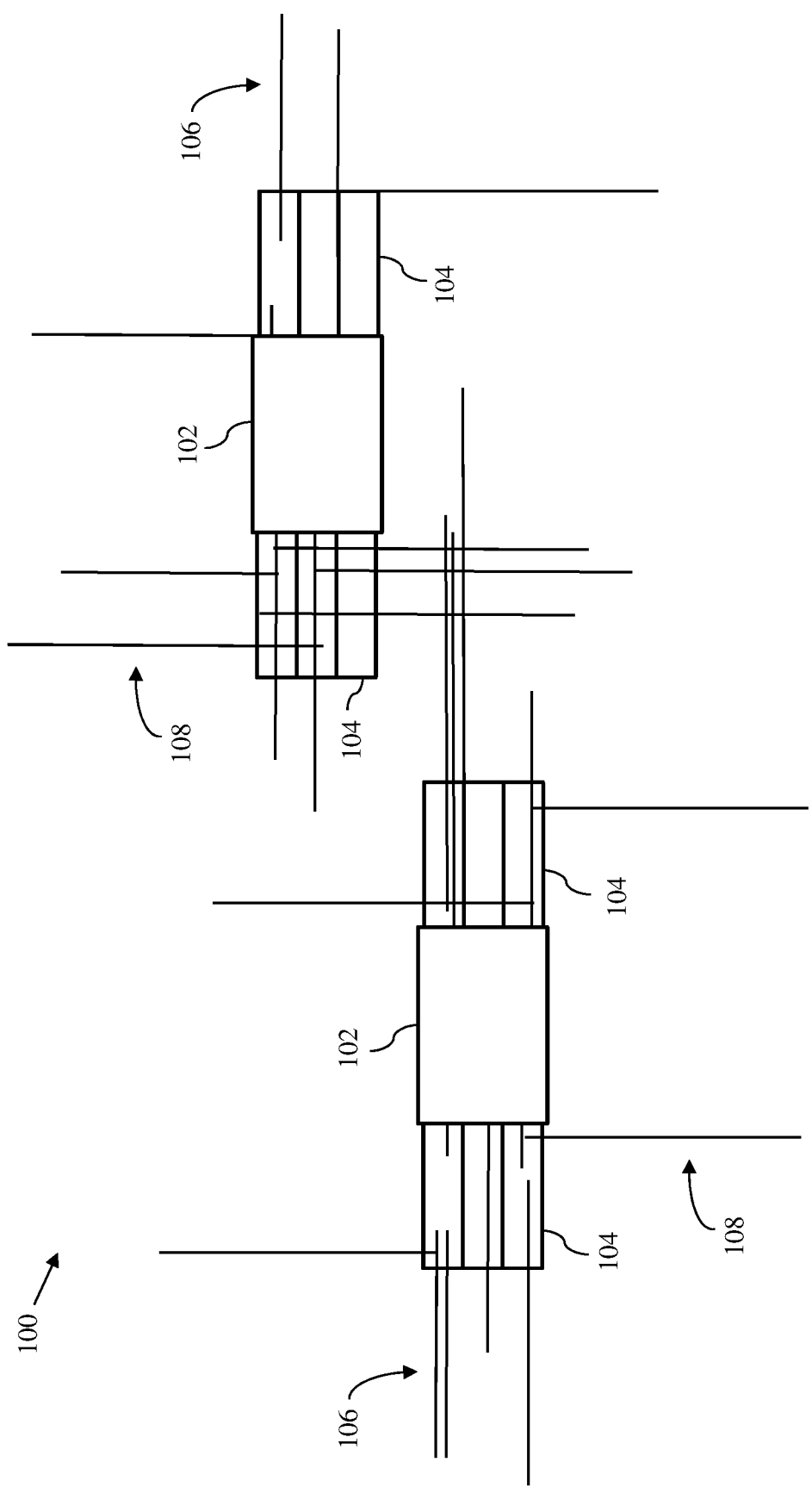
FIG. 1 illustrates a portion of a circuit layout having random clusters of latches that have been clustered and shuddled around local clock buffers.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Integrated circuits are used for a wide variety of electronic applications, from simple devices such as wristwatches to the most complex computer systems. A microelectronic integrated circuit (IC) chip can generally be thought of as a collection of logic cells with electrical interconnections between the cells, formed on a semiconductor substrate (e.g., silicon). An IC may include a very large number of cells and require complicated connections between the cells. A cell is a group of one or more circuit elements such as transistors, capacitors, resistors, inductors, and other basic circuit elements grouped to perform a logic function. Cell types include, for example, core cells, scan cells and input/output (I/O) cells. Each of the cells of an IC may have one or more pins, each of which in turn may be connected to one or more other pins of the IC by wires. The wires connecting the pins of the IC are also formed on the surface of the chip. For more complex designs, there are typically at least four distinct layers of conducting media available for muting, such as a polysilicon layer and three metal layers, (metal-1, metal-2, and metal-3). The polysilicon layer, metal-1, metal-2 and metal-3 are all used for vertical and/or horizontal routing.

An IC chip is fabricated by first conceiving the logical circuit description, and then converting that logical description into a physical description, or geometric layout. This process is usually carried out using a "netlist," which is a record of all of the nets, or interconnections, between the cell pins. A layout typically includes of a set of planar geometric shapes in several layers. The layout is then checked to ensure that it meets all of the design requirements, particularly timing requirements. The result is a set of design files known as an intermediate form that describes the layout. The design files are then converted into pattern generator files that are used to produce patterns called masks by an optical or electron beam pattern generator. During fabrication, these masks are used to pattern a silicon wafer using a sequence of photolithographic steps. The process of converting the specifications of an electrical circuit into a layout is called the physical design.

Cell placement in semiconductor fabrication involves a determination of where particular cells should optimally for near-optimally) be located on the surface of an integrated circuit device. Due to the large number of components and the details required by the fabrication process for very large scale integrated (VLSI) devices, physical design is not practical without the aid of computers. As a result, most phases of physical design extensively use computer-aided design (CAD) tools, and many phases have already been partially or fully automated. Automation of the physical design process has increased the level of integration, reduced turn around time and enhanced chip performance. Several different programming languages have been created for electronic design automation (EDA) including Verilog, very high speed integrated circuit hardware description language (VHDL) and time division multiplexing logic (TDML). A typical EDA system receives one or more high level behavioral descriptions of an IC device, and translates this high level design language description into netlists of various levels of abstraction.

While various techniques provide adequate placement of cells with regard to their data interconnections, there is an additional challenge for the designer in constructing a clock network for the cells, which require a large amount of power. There are several techniques for minimizing power while still achieving timing objectives for high performance, low power systems. One method involves the use of local clock buffers (LCBs) to distribute the clock signals. A typical clock control system has a clock generation circuit (e.g., a phase-lock loop) that generates a master clock signal which is fed to a clock distribution network that renders synchronized global clock signals at the LCBs. Each LCB adjusts the global clock duty cycle and edges to meet the requirements of respective circuit elements, e.g., local logic circuits or latches (the term "latch" as used herein stands for any clocked element which is usually a sink of a clock distribution network). Since this clock network is one of the largest power consumers among all of the interconnects, it is further beneficial to control the capacitive load of the LCBs, each of which is driving a set of many clock sinks. One approach for reducing the capacitive load is latch clustering, i.e., clusters of latches placed near the respective LCB of their clock domain. Latch clustering combined with LCBs can significantly reduce the total clock wire capacitance which in turn reduces overall clock power consumption.

Since most of the latches are placed close to an LCB, cock skew is also reduced which helps improve the timing of the circuit.

Turning now to an overview of technologies that are more specifically relevant to aspects of the invention, when placing cells in a circuit layout it is generally desirable to cluster and shuddle the latches around a local clock buffer (LCB) to facilitate data flow. A "shuddle", also known as a "structured huddle", is a collection of latches configured around an LCB. Generally, an LCB can only control a maximum number of latches, so many LCB's are typically required to accommodate a large number of latches. According to some embodiments, an LCB can control a maximum number of 36 latches, whereas in other embodiments an LCB can control a maximum number of 44 latches. However, it will be understood that in various embodiments, the maximum number of latches controlled by an LCB could be any number that an LCB is known to accommodate. Conventional methods of latch placement involve placing the latches based on timing characteristics and once placed, utilizing a clustering mechanism that involves cloning LCB's and a shuddling mechanism for placing LCB's and arranging the latches around each LCB. However, conventional clustering and shuddling mechanisms can result in clusters/shuddles that include latches having signals that travel both horizontally and vertically (i.e., the path of the wiring from sources and/or to sinks of the latch travel in a predominantly horizontal or vertical direction within the circuit layout), which can result in routing issues, such as scenic or over-congested routing. For example, prior methods of dusting latches for shuddling involve clustering all latches without regard to wire orientation of the input/output signals of the latches and then choosing shuddle configurations based off a pre-defined list and selecting from the list based on what is physically possible rather than physically optimal.

Turning now to an overview of the aspects of the invention, one or more embodiments of the invention address one or more of the above-described shortcomings of the prior art by disclosing methods and techniques for improved clustering and shuddling of latches around an LCB based on the orientation of the wires (or nets) connected to the latches, which can improve routing characteristics by reducing and/or preventing scenic routing (i.e., indirect and unnecessarily lengthy routes) and congestion. The pins of the latches are typically on a low metal layer of the circuit design and the signals are typically routed on higher layers. If the route is direct (rather than scenic) and the congestion is low then the overall route length can be minimized and the portion of the route that goes from the pin to the predominate routing layer will be minimal as well. Following placement of the latches based on timing and routing constraints, the algorithm determines which shuddle and cluster each latch should be put into by examining the latches, their overall routes and box of the net to determine if each is more horizontal or more vertical (e.g., by determining a ratio of horizontal to vertical attributes). In other words, the algorithm determines if the signals being latched are travelling vertically or horizontally and groups signals traveling in the same direction together and configures them in a manner that make sense based on that direction. In some cases, a signal may not be predominantly vertical or predominantly horizontal, in which case such a latch may either be grouped with latches having vertical or horizontal signals, or may be placed in a miscellaneous group in a structure that favors neither. Embodiments of the invention can provide better access to pins and can improve congestion and timing.

Turning now to a more detailed description of aspects of the present invention, FIG. 1 depicts a portion of a circuit layout 100 having latches 104 and local clock buffers 102 in accordance with one or more embodiments of the present invention. As shown, various latches 102 may have horizontal signals 106 and/or vertical signals 108 that connect the latches to one or more sources or sinks. A source is the originator or driver of the signal whereas a sink is the destination of the signal. Sources and sinks can be various types of circuit elements, including but not limited to other latches, buffers, inverters, arrays and any circuit element configured to transmit or receive an electronic signal. "Horizontal" and "vertical" signals may refer to an approximate direction within the 2-dimensional circuit layout 100 in which the signals travel. As will be appreciated by those of skill in the art, the direction of the signal may be dictated by the locations of the respective sources and sinks (not shown in FIG. 1) within the circuit layout 100 to which the signals are traveling, as the wiring/nets between each latch 104 and its respective sources/sinks may be disposed in a predominantly vertical or predominantly horizontal direction. According to some embodiments, a signal may not be predominantly vertical or horizontal (e.g., a signal that is at an approximately 45 degree angle to the latch 104), and in these cases the signal may be referred to as having a mixed orientation. As shown in FIG. 1, latches can be clustered and shuddled around LCB's 102 in a fashion in which various horizontal signals 106 and vertical signals 108 extend from adjacent latches 104 that have been shuddled around an LCB 102. This configuration can be problematic because the juxtaposition of horizontal signals 106 and vertical signals 108 in such close proximity to one another can result in problematic routing issues such as scenic routes, congestion and pin access problems. Further, this configuration may also create difficult access to pins of the latches 104. Thus, as described in greater detail below, embodiments of the present invention may seek to classify latches based on the orientation of the associated routing, and then cluster and shuddle the latches around the LCB based on these orientations.

Figure 2:
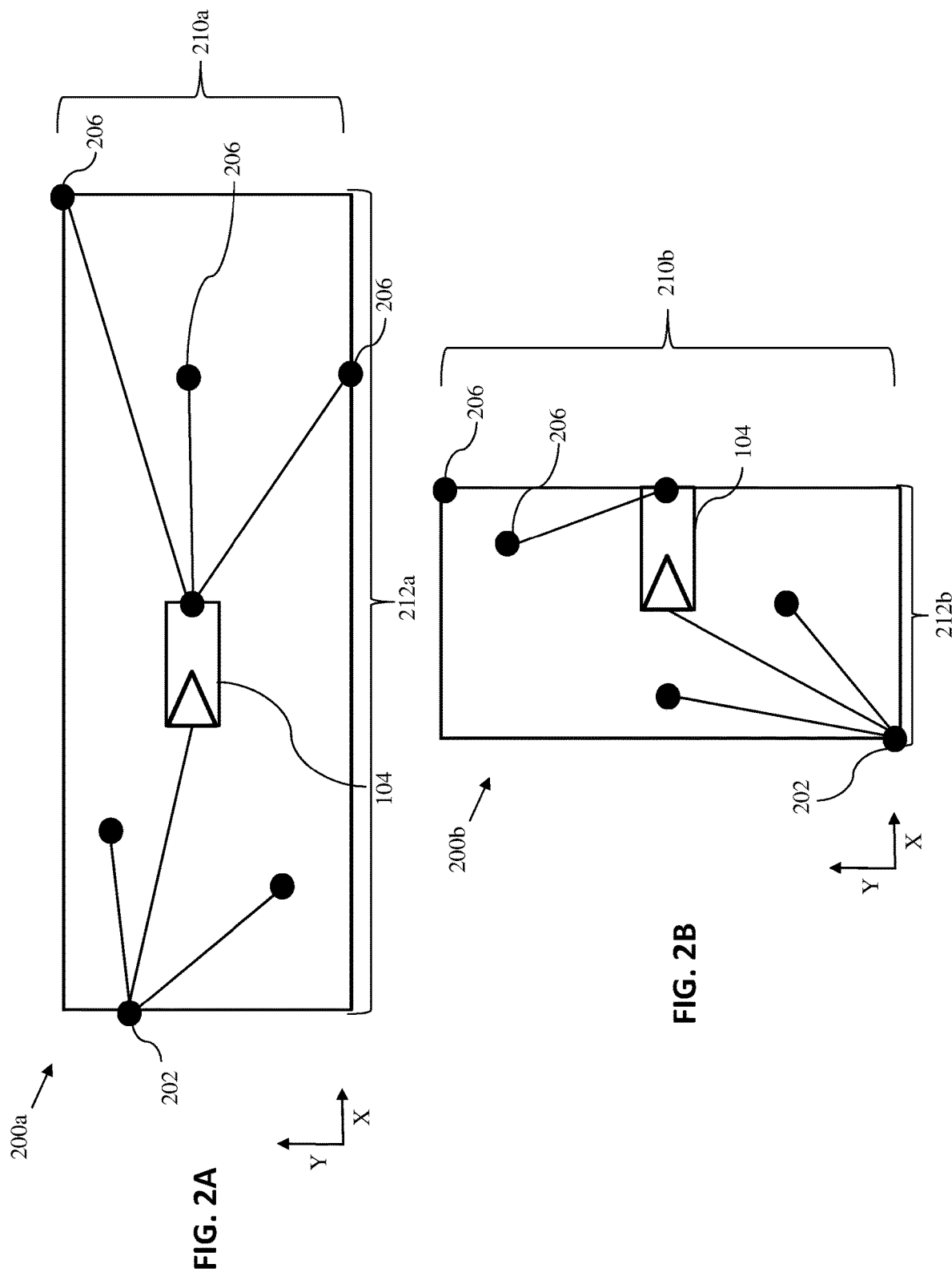
FIG. 2A illustrates an example bounding box of a latch in accordance with one or more embodiments of the present invention.
FIG. 2B illustrates another example bounding box of a latch in accordance with one or more embodiments of the present invention.

In accordance with embodiments of the present invention, the orientation of a latch's routing/nets can be determined by examining the bounding box of the signals connected to a given latch. FIGS. 2A and 2B depict examples of a first bounding box 200a and a second bounding box 200b around two latches 104, respectively in accordance with one or more embodiments of the present invention. As shown, each latch 104 can have a single source 202 that transmits a signal to the latch 104, as well as one or more sinks 206 that receive a signal output by the latch 104. According to some embodiments, a bounding box of a latch may be formed by placing a rectangular box around the latch, where the box is bounded by the input net source 202 and the furthest most output net sinks 206 in each direction. For example, the northern edge of the bounding box 200a can be positioned at height in the Y-direction that coincides with a source 202 or sink 206 that has the highest Y-value (referring to placement of the source/sinks within an (X,Y) coordinate scheme). Similarly, the southern edge of the bounding box 200a can be positioned at a height in the Y-direction that coincides with the source 202 or sink 206 that has the lowest Y value. Likewise, the east and west edges of bounding box 200a can be positioned at a length in the X-direction that coincides with the source 202 or sink 206 that has the highest and lowest X values, respectively.

As shown in FIGS. 2A and 2B, each bounding box 200a, 200b may have a respective horizontal length 212a, 212b and a respective vertical length 210a, 210b corresponding to the lengths of the bounding boxes 200a, 200b in the X and Y directions. The system can calculate a ratio of the vertical length to the horizontal length (or vice versa) of the bounding boxes 200a, 200b, which can then be used to classify whether the associated latches 104 have a vertical orientation, horizontal orientation or mixed orientation in comparison to predetermined threshold ratios. For example, in some embodiments, if a first edge of the bounding box is at least twice as long as a perpendicular second edge, then the bounding box may be considered to be oriented in the direction of the first edge. Thus, for example, if the bounding box 200a shown in FIG. 2A has a horizontal length 212a of "3" and a vertical length 210a of "1", then the horizontal length is three times the length of the vertical length, exceeding for example, a predetermined threshold ratio of "2", in which case the bounding box 200a may be classified as having a horizontal orientation. Similarly, the bounding box 200b shown in FIG. 2B may be considered to have a vertical orientation if the ratio of the vertical edge 210b to the horizontal edge 212b exceeds a predetermined threshold ratio. Although a threshold ratio of "2" is used herein as an example, it will be understood that in various embodiments the threshold ratio may be selected to be any different number. If the ratio of the perpendicular edges of a bounding box does not exceed a predetermined threshold ratio in either direction (i.e., it does not qualify as having either a vertical orientation or a horizontal orientation), then the latch associated with the bounding boxed can be considered to have a mixed orientation (i.e., an orientation that is neither predominantly horizontal or predominantly vertical). As described below, the orientations of the latches can be used to cluster and shuddle the latches around LCBs to provide improved electrical properties for routing.

Figure 3:
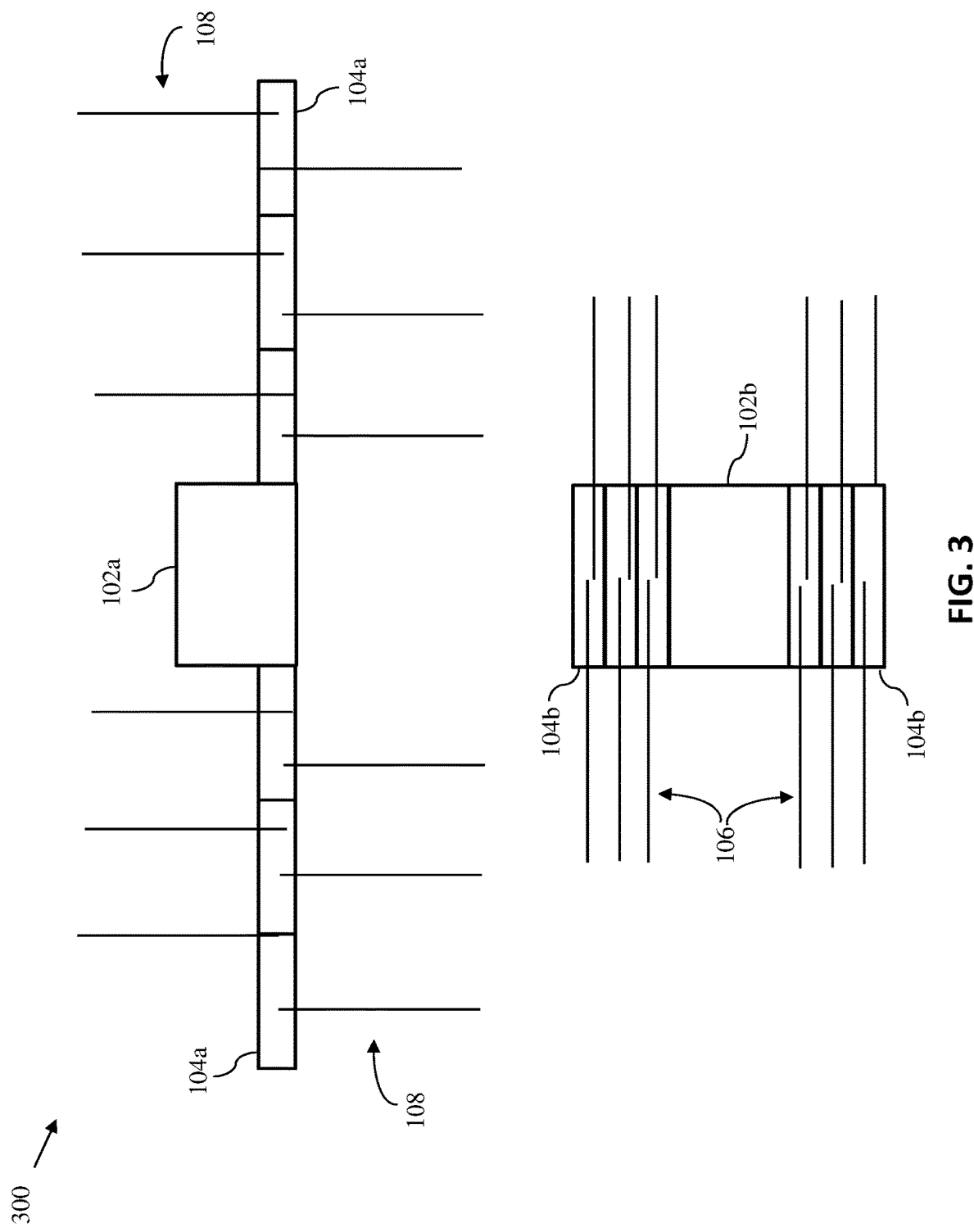
FIG. 3 illustrates a portion of a circuit layout having latches and local clock buffers that have been clustered and shuddled in accordance with one or more embodiments of the present invention.

FIG. 3 depicts a portion of a layout 300 of an integrated circuit in accordance with one or more embodiments of the present invention. As shown in FIG. 3, the latches 104 have been clustered and shuddled around respective LCB's 102 in accordance with a method 500 for providing wire orientation-based latch shuddling, as described in greater detail below with respect to FIG. 5. In some embodiments, the layout 300 (e.g., a circuit layout or semiconductor layout) can be generated using the computer system 400 shown in FIG. 4. Although only a portion of a semiconductor layout is shown in FIGS. 1 and 3, those of skill in the art will recognize that a semiconductor layout may be made up of macro blocks having rows that are occupied by various cells (with each cell containing one or more transistors) that provides a useful layer of hierarchical abstraction for designing an integrated circuit that may contain billions of transistors. The computer system 400 has one or more software applications 402 configured to function and implement operations as discussed herein. For example, software applications 402 may include one or more placement routines for clustering latches 104 based on their routing/wiring characteristics and shuddling the clusters around respective LCB's in a manner that provides better access to pins and can improve congestion and timing. According to some embodiments, software applications 402 can provide other place and fill routines for placing functional cells and fill cells in order to complete a semiconductor layout. A semiconductor layout 300 can be constructed by the software application 402 of the computer 400 to build the semiconductor device (e.g., an integrated circuit). The computer 400 can be configured guarantee design rule cleanliness (i.e., pass) for a semiconductor device before and/or without requiring a design rule check.

Figure 4:
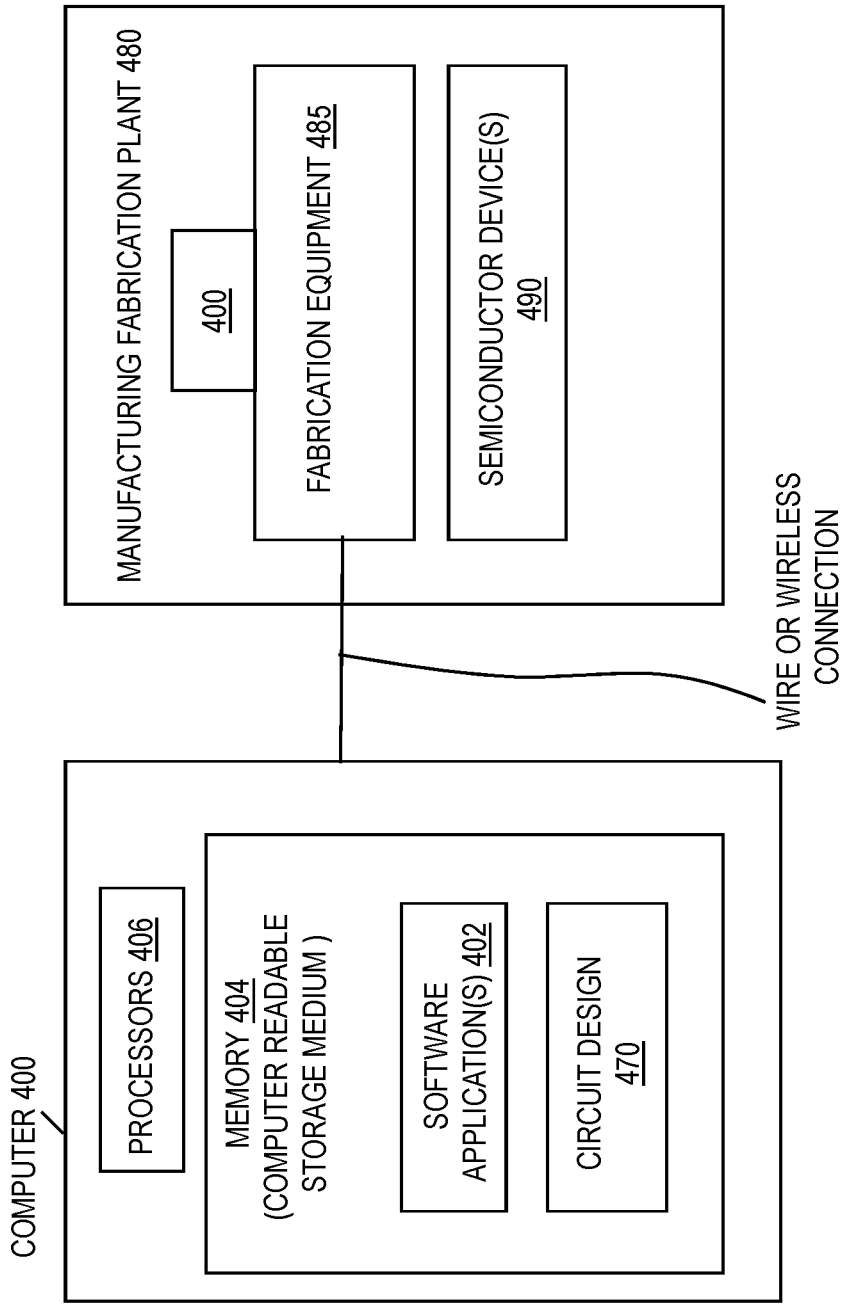
FIG. 4 depicts a system of a computer system integrated with a manufacturing fabrication plant according to embodiments of the invention.

The software applications 402 include, integrate, are coupled to, and/or function as electronic design automation (EDA), also referred to as electronic computer-aided design (ECAD). Electronic design automation is a category of software tools for designing electronic systems such as integrated circuits and printed circuit boards. The tools work together in a design flow that chip designers use to design and analyze entire semiconductor chips. In some implementations, the computer 400 is coupled to, integrated with, and/or part of the fabrication equipment 485 at the manufacturing fabrication plant 480 (so as to communicate with and/or control operations of the fabrication equipment 485) to thereby fabricate semiconductor device(s) 490 as depicted in FIG. 4, as understood by one skilled in the art. The computer 400 includes one or processors 406 configured to execute one or more software applications 402 in memory 404. The computer 400 receives input of a design 470 for the semiconductor device 490, and the computer 400 is configured to develop/form the semiconductor layout 300 for the semiconductor device in order to build the semiconductor device. The semiconductor layout 400 is a physical design released to the manufacturing fabrication (Fab) plant 480 and physically fabricated by the fabrication equipment 485 to produce the semiconductor device 490. The manufacturing fabrication plant 480 builds the photo mask from the semiconductor layout 300 as a physical design, and then builds the actual product using the photo mask. The product is an integrated circuit (i.e., semiconductor device 490) on a wafer according to the semiconductor layout 300 (physical design). There may be numerous integrated circuits on a wafer, and each integrated circuit may be diced into an individual chip.

Figure 5:
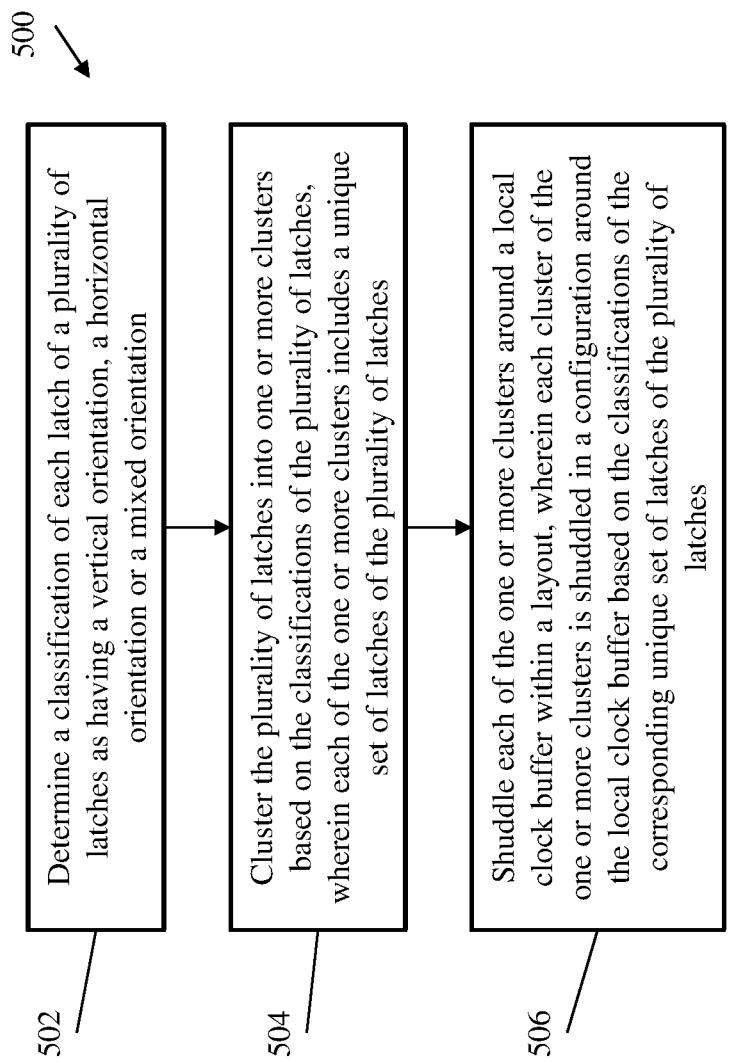
FIG. 5 illustrates a flow diagram of a process for providing wire orientation-based latch shuddling in accordance with one or more embodiments of the present invention.

Turning now to FIG. 5, a flow diagram of a method 500 for providing wire orientation-based latch shuddling in accordance with an embodiment is shown. In one or more embodiments of the present invention, the method 500 may be embodied in software that is executed by elements of computer 400 illustrated in FIG. 4, embodied in software that is executed by computer elements located within a network that may reside in the cloud, such as the cloud computing environment 50 described herein above and illustrated in FIGS. 7 and 8. In other embodiments, the computer elements may reside on a computer system or processing system, such as the processing system 900 described herein above and illustrated in FIG. 9, or in some other type of computing or processing environment.

The method 500 begins at block 502 and includes determining (e.g., via computer 400) a classification of each latch of a plurality of latches as having a vertical orientation, a horizontal orientation or a mixed orientation. As described herein, a "vertical orientation" can mean that the wiring and/or routing associated with the latch has a substantially vertical orientation within a 2-dimensional circuit layout and a "horizontal orientation" can mean that the wiring and/or routing associated with the latch has a substantially horizontal orientation within the 2-dimensional circuit layout. According to some embodiments, determining a classification of each latch of a plurality of latches can include, for each latch of the plurality of latches, defining a bounding box around the latch based on the routes associated with the latch and determining the classification based on the dimensions of the bounding box. In some embodiments, defining a bounding box around the latch based on the routes associated with the routes can include identifying one or more sources and sinks of the latch, plotting positions of the one or more sources and sinks of the latch in a two-dimensional plane around the latch and defining a rectangular box around the latch. As described above with respect to FIGS. 2A and 2B, a position of each edge of the rectangular box can be defined by a source or a sink of the one or more sources and sinks of the latch that is a further distance away from the latch in a respective north, south, east or west direction from the latch in the two-dimensional plane.

According to some embodiments, determining the classification based on the dimensions of the bounding box can include determining a vertical length of the bounding box, determining a horizontal length of the bounding box and classifying the latch based on a ratio between the vertical length of the bounding box and the horizontal length of the bounding box. In some embodiments, classifying the latch based on a ratio between the vertical length of the bounding box and the horizontal length of the bounding box can include classifying the latch as having a vertical orientation in response to determining that the ratio exceeds a first predetermined threshold, classifying the latch as having a horizontal orientation in response to determining that the ratio is less than a second predetermined threshold and classifying the latch as having a mixed orientation in response to determining that the ratio is less than or equal to the first predetermined threshold and greater than or equal to the second predetermined threshold. In some embodiments, the first and second ratio can be designated as any numbers by a user. According to some embodiments, the second predetermined threshold can be the inverse of the first predetermined threshold. For example, in some embodiments, the first predetermined threshold can be "2" and the second predetermined threshold can be "0.5." In some embodiments, the first predetermined threshold can be "3" and the second predetermined threshold can be "⅓". In some embodiments the first predetermined threshold can be "1.5" and the second predetermined threshold can be "⅔". It will be understood that these threshold ratio values are merely examples and many different values may be selected in accordance with various embodiments.

As shown at block 504, the method includes clustering (e.g., via computer 400) the plurality of latches into one or more clusters based on the classifications of the plurality of latches. According to some embodiments, each of the one or more clusters includes a unique set of latches of the plurality of latches. According to some embodiments, clustering the plurality of latches into one or more clusters based on the classifications of the plurality of latches can include designating each latch of the plurality of latches that is classified as having a vertical orientation as being part of a first group of latches, designating each latch of the plurality of latches that is classified as having a horizontal orientation as being part of a second group of latches, forming one or more first clusters from at least the first group of latches and forming one or more second clusters from at least the second group of latches. In other words, all of the latches that have a vertical orientation can be grouped into a first group and all of the latches that have a horizontal orientation can be grouped into a second group, and separate clusters can then be formed from each of these two groups, for example, based on the maximum number of latches that an LCB can control. For example, if the maximum number of latches that can be controlled by one LCB is 26 and the first group of latches (i.e., the latches classified as having a vertical orientation) has 132 latches and the second group of latches (i.e., the latches classified has having a horizontal orientation) has 100 latches, the system may create 6 clusters of vertically oriented latches from the first group (e.g., each cluster having 22 vertically oriented latches) and 4 clusters of horizontally oriented latches (e.g., each cluster having 25 horizontally oriented clusters).

In some embodiments, at least one of the one or more first clusters and one or more of the second clusters can further include one or more latches of the plurality of latches that are classified as having a mixed orientation. In other words, according to some embodiments of the invention, the latches that are classified as having a mixed orientation can be used to "fill in" the clusters of predominantly horizontal or vertical clusters. For example, to continue on with the previous example, if there are 10 latches having a mixed orientation, up to 4 of them could be placed in any of the 6 clusters of vertically oriented latches (i.e., to meet the maximum latch count of 26) or up to 1 of them could be placed in any of the clusters of horizontally oriented latches. In some embodiments, the system may distribute latches having a mixed orientation to the nearest LCB that has available space. If there are no LCBs with available space within a predetermined radius of the latch, then a new cluster/shuddle can be formed around new cloned LCB to accommodate such latches. In this case, the system may assign all nearby latches having a mixed orientation to the new cluster around the newly cloned LCB and the cluster can be shuddled around the LCB in an approximately square shape that favors neither a vertical or horizontal vertical routing alignment. According to some embodiments, if there are very large numbers of latches of all three types of orientation (i.e., each type is in excess of the maximum number that can be handled by one LCB), a clustering routine may form clusters that are filled up entirely with all vertical and/or all horizontally oriented latches first, and then fill in a remaining partially filled cluster of each with mixed orientation latches and forming clusters of mixed orientation latches with the remaining latches. In some embodiments, a clustering routine may instead attempt to distribute all of the mixed orientation latches (e.g., approximately evenly) among the clusters that are otherwise dominated by only horizontally or vertically oriented latches. As will be appreciated by those of skill in the art, many different clustering routines or algorithms could be used that could result in different distributions of the mixed orientation latches among the clusters of horizontally oriented latches and the clusters of vertically oriented latches. Further, different clustering routines may generate different benefits, for example, a clustering routine that distributes mixed orientation latches out evenly among LCB clusters would save power as fewer LCBs would be required, whereas a clustering routine that condenses mixed orientation latches into their own cluster would keep the latches closer to their ideal placement, which can result in better timing characteristics of the circuit design.

As shown at block 506, the method includes shuddling (e.g., via computer 400) each of the one or more clusters around a local clock buffer within a layout. According to some embodiments, each cluster of the one or more clusters can be shuddled in a configuration around the local clock buffer based on the classifications of the corresponding unique set of latches of the plurality of latches. In other words, clusters having mostly (or all) vertically oriented latches can be shuddled around an LCB in a configuration that differs from how clusters having mostly (or all) horizontally oriented latches are shuddled around an LCB. For example, in some embodiments, as shown in FIG. 3, the one or more first clusters (i.e., clusters with vertically oriented latches) can each be shuddled around a respective local clock buffer 102a by arranging latches 104a of the respective cluster in a row extending in a horizontal direction away from both a left and a right edge of the respective local clock buffer 102a. Likewise, in some embodiments, as also shown in FIG. 3, the one or more second clusters (i.e., clusters with horizontally oriented latches) can each be shuddled around a respective local clock buffer 102b by arranging latches 104b of the respective cluster in a row extending in a vertical direction away from both a top and a bottom edge of the respective local clock buffer 104b. As shown in FIG. 3, this clustering and shuddling of latches based on the orientation of the routing allows for the latches to be configured around LCB's in a manner that provides for more easily accessible pins (requiring less wiring) and signal routing that is generally aligned vertically (e.g., as shown by vertical signals 108) or horizontally (e.g., as shown by horizontal signals 106) in a manner that does not cross or interfere with cross-directional wiring, which reduces interference between signals and allows for the signaling/wiring to have the correct electrical properties (e.g., less scenic routing, less congestion, etc.).

Figure 6:
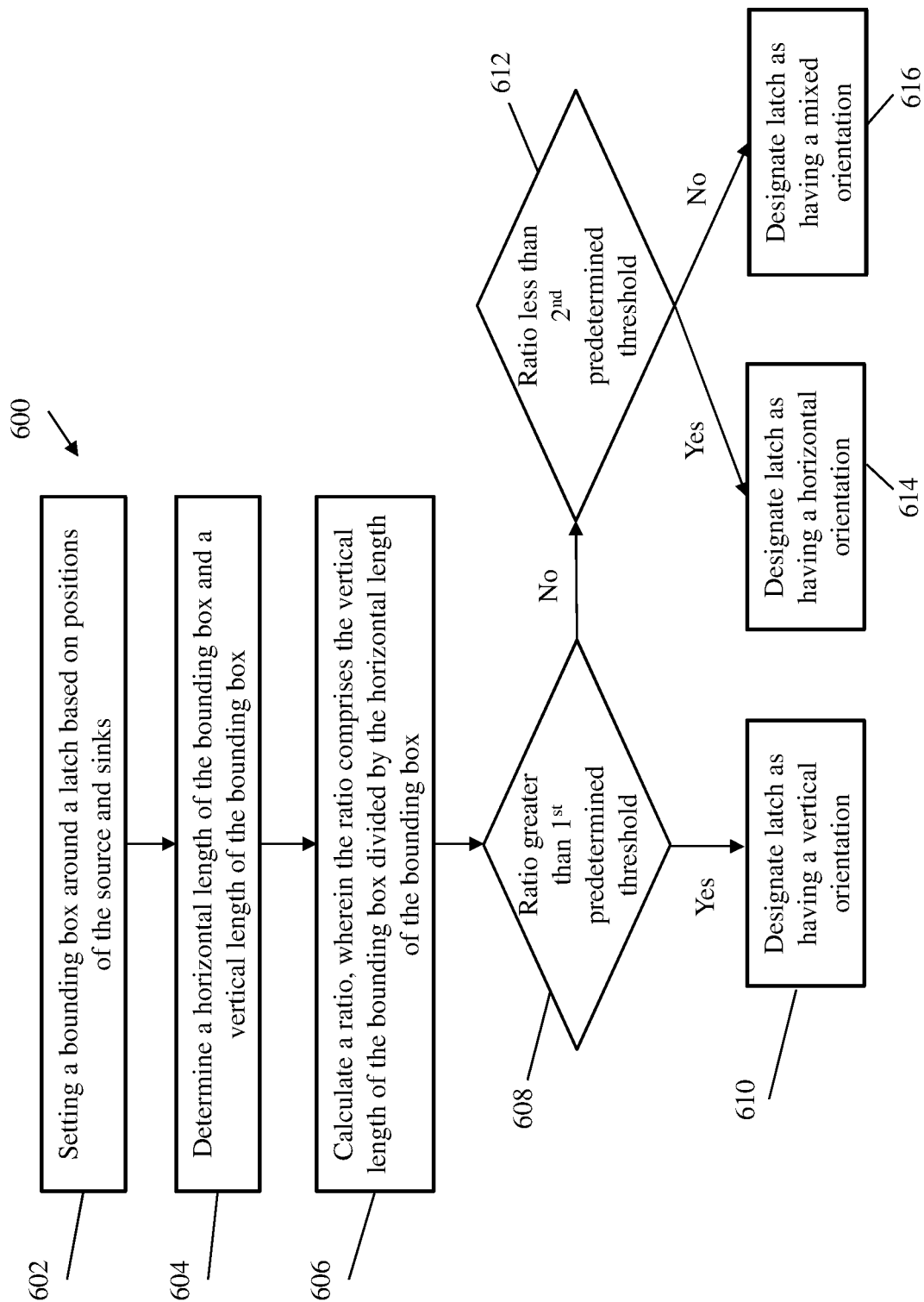
FIG. 6 illustrates a flow diagram of a process for determining the orientation of a latch in accordance with one or more embodiments of the present invention.

Turning now to FIG. 6, a flow diagram of a method 600 for determining the orientation of a latch in accordance with an embodiment is shown. In one or more embodiments of the present invention, the method 600 may be embodied in software that is executed by elements of computer 400 illustrated in FIG. 4, embodied in software that is executed by computer elements located within a network that may reside in the cloud, such as the cloud computing environment 50 described herein above and illustrated in FIGS. 7 and 8. In other embodiments, the computer elements may reside on a computer system or processing system, such as the processing system 900 described herein above and illustrated in FIG. 9, or in some other type of computing or processing environment.

The method 600 begins at block 602 and includes setting (e.g., via computer 400) a bounding box around a latch based on positions of the source and sinks to the latch, as described above with respect to FIGS. 2A and 2B.

As shown at block 604, the method includes determining (e.g., via computer 400) a horizontal length of the bounding box and a vertical length of the bounding box by, for example, measuring the length of one vertical edge and one horizontal edge of the bounding box.

As shown at block 606, the method includes calculating (e.g., via computer 400) a ratio based on the vertical length and the horizontal length of the bounding box. According to some embodiments, the ratio can be calculated by dividing the vertical length by the horizontal length.

As shown at block 608, the method includes determining (e.g., via computer 400) whether the ratio is greater than a first predetermined threshold. If it is the method proceeds to block 610, which includes designating the latch as having a vertical orientation. If it does not, the method proceeds to block 612, which includes determining (e.g., via computer 400) whether the ratio is less than a second predetermined threshold. If it is, the method proceeds to block 614, which includes designating (e.g., via computer 400) the latch as having a horizontal orientation. If it isn't, the method proceeds to block 616, which includes designating (e.g., via computer 400) the latch as having a mixed orientation. Although this method has been described with respect to a ratio that reflects the vertical length divided by the horizontal length, it will be appreciated that in other embodiments, a ratio that represents the horizontal length of the bounding box divided by the vertical length of the bounding box are also contemplated (along with appropriate modifications to the predetermined thresholds and the "greater than" and "less than" comparisons thereto). Further, this algorithm is merely illustrative and any other algorithm or calculation for determining whether the ratio of the vertical length to the horizontal length of the bounding box results in a determination (when compared to predetermined or user selected thresholds) is predominantly vertical, predominantly horizontal or of a mixed orientation could be used in conjunction with the embodiments of the present invention.

Additional processes may also be included. It should be understood that the processes depicted in FIGS. 5 and 6 represent illustrations, and that other processes may be added or existing processes may be removed, modified, or rearranged without departing from the scope and spirit of the present disclosure.

Figure 7:
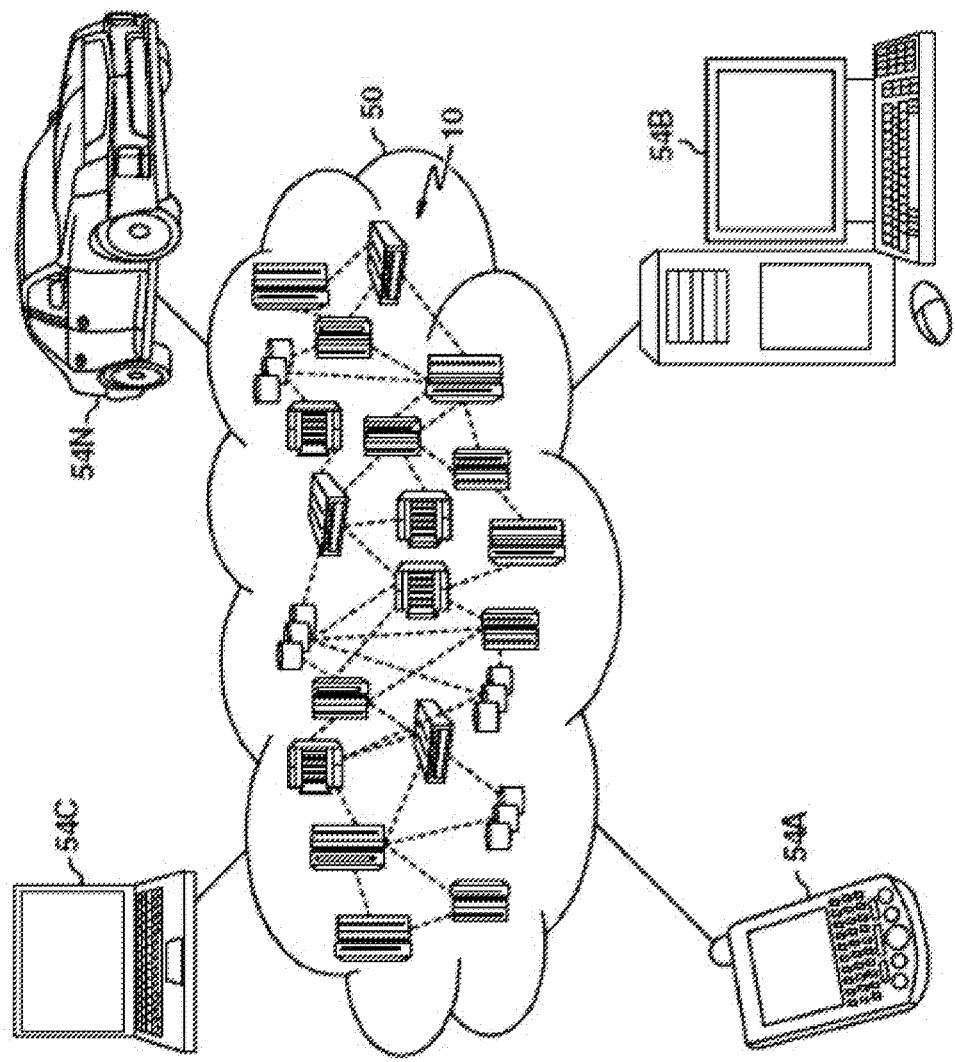
FIG. 7 illustrates a cloud computing environment according to one or more embodiments of the present invention.
Figure 8:
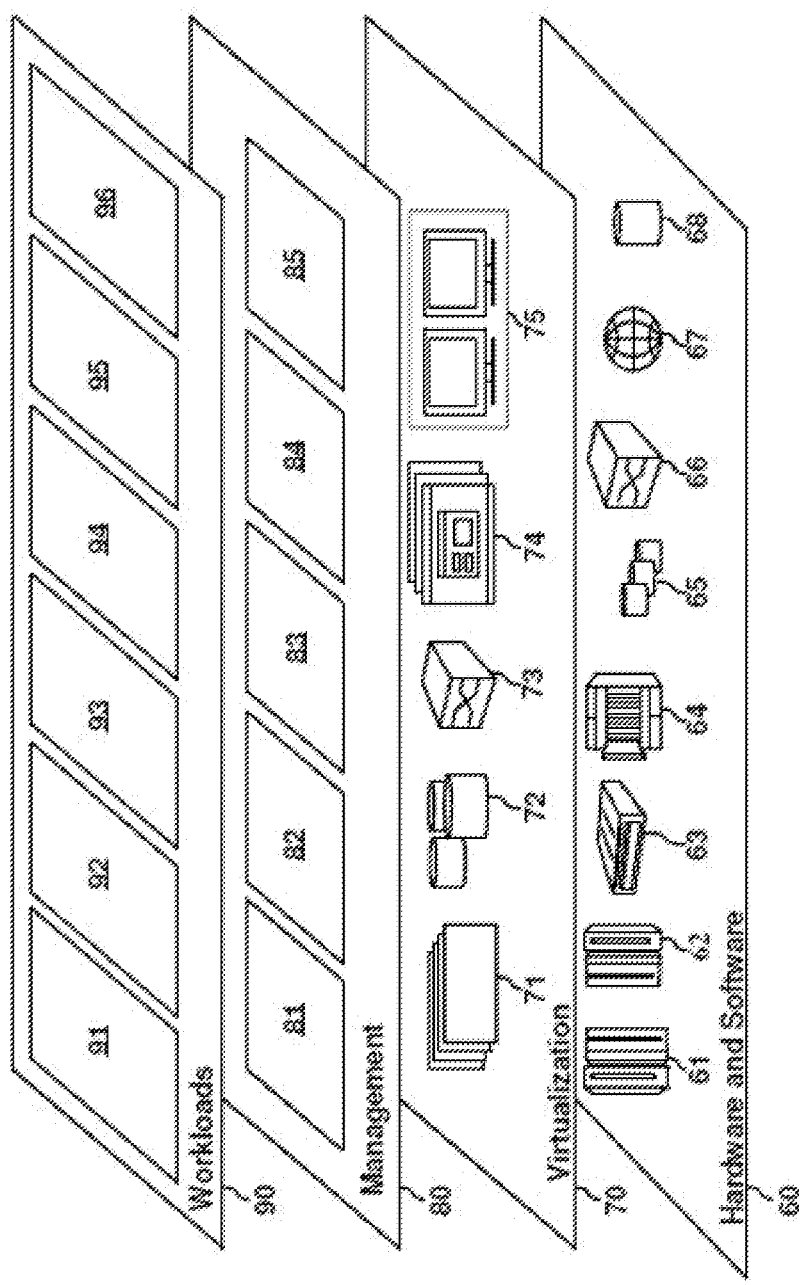
FIG. 8 illustrates abstraction model layers according to one or more embodiments of the present invention.

FIG. 7 depicts a cloud computing environment according to one or more embodiments of the present invention. FIG. 8 depicts abstraction model layers according to one or more embodiments of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing wire orientation-based latch shuddling 96.

Figure 9:
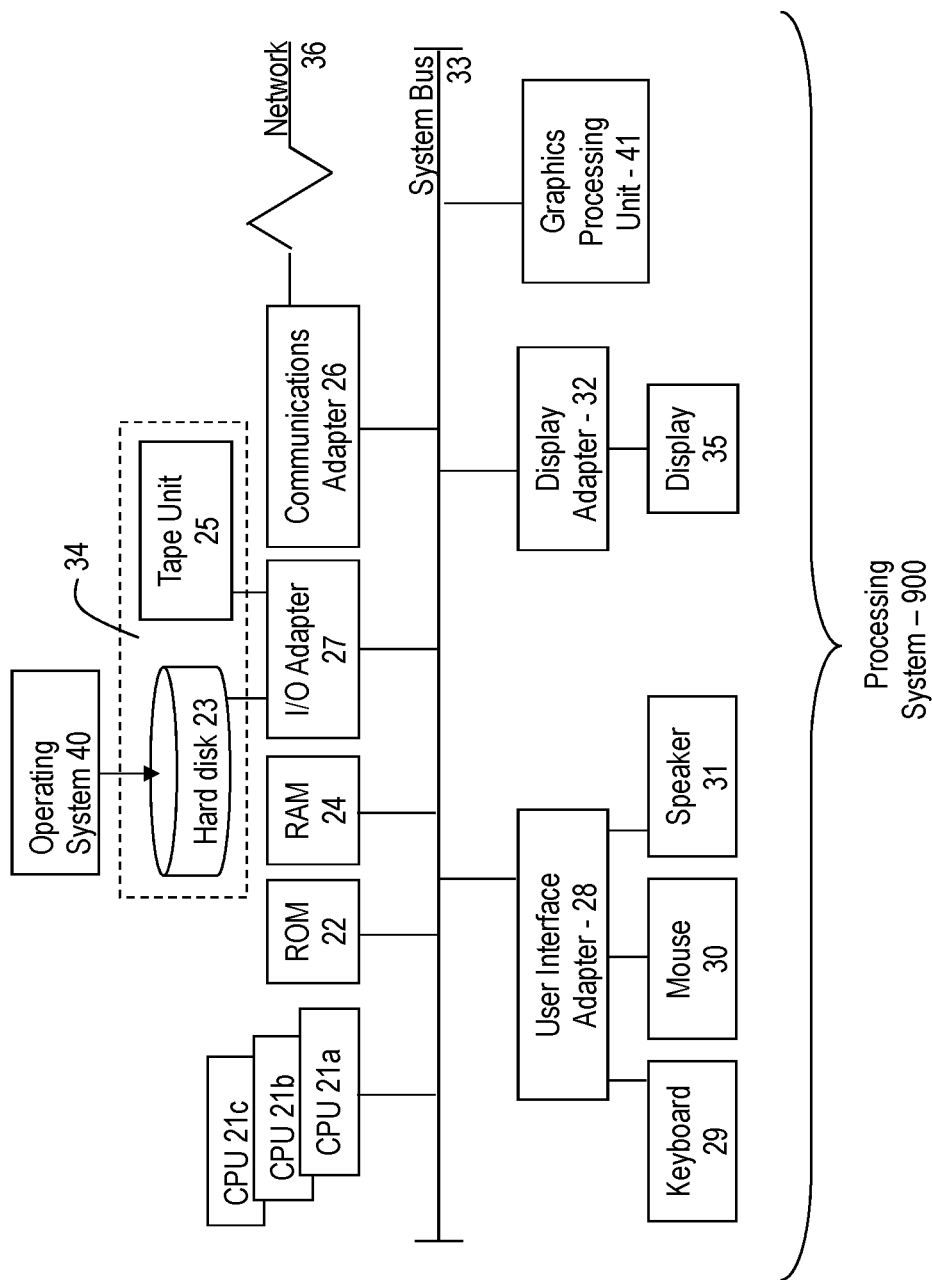
FIG. 9 illustrates a block diagram of a computer system for use in implementing one or more embodiments of the present invention.

FIG. 9 depicts a processing system for implementing one or more embodiments of the present invention. It is understood that one or more embodiments of the present invention are capable of being implemented in conjunction with any other type of computing environment now known or later developed. For example, FIG. 9 depicts a block diagram of a processing system 900 for implementing the techniques described herein. In accordance with one or more embodiments of the present invention, computer 400 and/or system 900 can be an example of a cloud computing node 10 of FIG. 7. In the embodiment shown in FIG. 9, processing system 900 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 900.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 900 can be stored in mass storage 34. The RAM 24, ROM 22, and mass storage 34 are examples of memory 19 of the processing system 900. A network adapter 26 interconnects system bus 33 with an outside network 36 enabling the processing system 900 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 900 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 900 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 900.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilizes a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants.

Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   determining a classification of each latch of a plurality of latches as comprising a vertical orientation, a horizontal orientation or a mixed orientation;
   clustering the plurality of latches into one or more clusters based on the classifications of the plurality of latches, wherein each of the one or more clusters comprises a unique set of latches of the plurality of latches; and
   shuddling each of the one or more clusters around a local clock buffer within a layout, wherein each cluster of the one or more clusters is shuddled in a configuration around the local clock buffer based on the classifications of the corresponding unique set of latches of the plurality of latches.

2. The computer-implemented method of claim 1, wherein determining a classification of each latch of a plurality of latches comprises for each latch of the plurality of latches:
   defining a bounding box around the latch based on one or more routes associated with the latch; and
   determining the classification based on dimensions of the bounding box.

3. The computer-implemented method of claim 2, wherein defining a bounding box around the latch based on the one or more routes associated with the routes comprises:
   identifying one or more sources and sinks of the latch;
   plotting positions of the one or more sources and sinks of the latch in a two-dimensional plane around the latch; and
   defining a rectangular box around the latch, wherein a position of each edge of the rectangular box is defined by a source or a sink of the one or more sources and sinks of the latch that is a further distance away from the latch in a respective north, south, east or west direction from the latch in the two-dimensional plane.

4. The computer-implemented method of claim 3, wherein determining the classification based on dimensions of the bounding box comprises:
   determining a vertical length of the bounding box;
   determining a horizontal length of the bounding box; and
   classifying the latch based on a ratio between the vertical length of the bounding box and the horizontal length of the bounding box.

5. The computer-implemented method of claim 4, wherein classifying the latch based on a ratio between the vertical length of the bounding box and the horizontal length of the bounding box comprises:
   classifying the latch as comprising a vertical orientation in response to determining that the ratio exceeds a first predetermined threshold;
   classifying the latch as comprising a horizontal orientation in response to determining that the ratio is less than a second predetermined threshold; and
   classifying the latch as comprising a mixed orientation in response to determining that the ratio is less than or equal to the first predetermined threshold and greater than or equal to the second predetermined threshold.

6. The computer-implemented method of claim 5, wherein the first predetermined threshold is 2 and the second predetermined threshold is 0.5.

7. The computer-implemented method of claim 1, wherein clustering the plurality of latches into one or more clusters based on the classifications of the plurality of latches comprises:
   designating each latch of the plurality of latches that is classified as comprising a vertical orientation as being part of a first group of latches;
   designating each latch of the plurality of latches that is classified as comprising a horizontal orientation as being part of a second group of latches;
   forming one or more first clusters from at least the first group of latches; and
   forming one or more second clusters from at least the second group of latches.

8. The computer-implemented method of claim 7, wherein at least one of the one or more first clusters and one or more of the second clusters further comprises one or more latches of the plurality of latches that are classified as comprising a mixed orientation.

9. The computer-implemented method of claim 7, wherein the one or more first clusters are each shuddled around a respective local clock buffer by arranging latches of the respective cluster in a row extending in a horizontal direction away from both a left and a right edge of the respective local clock buffer.

10. The computer-implemented method of claim 1, wherein the one or more second clusters are each shuddled around a respective local clock buffer by arranging latches of the respective cluster in a row extending in a vertical direction away from both a top and a bottom edge of the respective local clock buffer.

11. A system comprising:
    a memory having computer readable instructions; and
    one or more processors for executing the computer readable instructions, the computer readable instructions controlling the one or more processors to perform operations comprising:
       determining a classification of each latch of a plurality of latches as comprising a vertical orientation, a horizontal orientation or a mixed orientation;
       clustering the plurality of latches into one or more clusters based on the classifications of the plurality of latches, wherein each of the one or more clusters comprises a unique set of latches of the plurality of latches; and shuddling each of the one or more clusters around a local clock buffer within a layout, wherein each cluster of the one or more clusters is shuddled in a configuration around the local clock buffer based on the classifications of the corresponding unique set of latches of the plurality of latches.

12. The system of claim 11, wherein determining a classification of each latch of a plurality of latches comprises for each latch of the plurality of latches:
   defining a bounding box around the latch based on one or more routes associated with the latch; and
   determining the classification based on dimensions of the bounding box.

13. The system of claim 12, wherein defining a bounding box around the latch based on the one or more routes associated with the routes comprises:
   identifying one or more sources and sinks of the latch;
   plotting positions of the one or more sources and sinks of the latch in a two-dimensional plane around the latch; and
   defining a rectangular box around the latch, wherein a position of each edge of the rectangular box is defined by a source or a sink of the one or more sources and sinks of the latch that is a further distance away from the latch in a respective north, south, east or west direction from the latch in the two-dimensional plane.

14. The system of claim 13, wherein determining the classification based on dimensions of the bounding box comprises:
   determining a vertical length of the bounding box;
   determining a horizontal length of the bounding box; and
   classifying the latch based on a ratio between the vertical length of the bounding box and the horizontal length of the bounding box.

15. The system of claim 14, wherein classifying the latch based on a ratio between the vertical length of the bounding box and the horizontal length of the bounding box comprises:
   classifying the latch as comprising a vertical orientation in response to determining that the ratio exceeds a first predetermined threshold;
   classifying the latch as comprising a horizontal orientation in response to determining that the ratio is less than a second predetermined threshold; and
   classifying the latch as comprising a mixed orientation in response to determining that the ratio is less than or equal to the first predetermined threshold and greater than or equal to the second predetermined threshold.

16. The system of claim 15, wherein the first predetermined threshold is 2 and the second predetermined threshold is 0.5.

17. A computer program product comprising a non-transitory computer readable storage medium having program instructions embodied therewith, the program instructions executable by a computer processor to cause the computer processor to perform a method comprising:
   determining a classification of each latch of a plurality of latches as comprising a vertical orientation, a horizontal orientation or a mixed orientation;
   clustering the plurality of latches into one or more clusters based on the classifications of the plurality of latches, wherein each of the one or more clusters comprises a unique set of latches of the plurality of latches; and
   shuddling each of the one or more clusters around a local clock buffer within a layout, wherein each cluster of the one or more clusters is shuddled in a configuration around the local clock buffer based on the classifications of the corresponding unique set of latches of the plurality of latches.

18. The computer program product of claim 17, wherein determining a classification of each latch of a plurality of latches comprises for each latch of the plurality of latches:
   defining a bounding box around the latch based on one or more routes associated with the latch; and
   determining the classification based on dimensions of the bounding box.

19. The computer program product of claim 18, wherein defining a bounding box around the latch based on the one or more routes associated with the routes comprises:
   identifying one or more sources and sinks of the latch;
   plotting positions of the one or more sources and sinks of the latch in a two-dimensional plane around the latch; and
   defining a rectangular box around the latch, wherein a position of each edge of the rectangular box is defined by a source or a sink of the one or more sources and sinks of the latch that is a further distance away from the latch in a respective north, south, east or west direction from the latch in the two-dimensional plane.

20. The computer program product of claim 19, wherein determining the classification based on dimensions of the bounding box comprises:
   determining a vertical length of the bounding box;
   determining a horizontal length of the bounding box; and
   classifying the latch based on a ratio between the vertical length of the bounding box and the horizontal length of the bounding box.

\* \* \* \* \*